M. WHISLER.
CORN-PLANTER.

No. 174,993. Patented March 21, 1876.

WITNESSES;

INVENTOR.
Mark Whisler

UNITED STATES PATENT OFFICE.

MARK WHISLER, OF BOONE COUNTY, INDIANA, ASSIGNOR TO HIMSELF AND THOMAS WHISLER, OF SAME PLACE.

IMPROVEMENT IN CORN-PLANTERS.

Specification forming part of Letters Patent No. 174,993, dated March 21, 1876; application filed September 16, 1875.

*To all whom it may concern:*

Be it known that I, MARK WHISLER, of Boone county, State of Indiana, have invented a new and useful Improvement in Corn-Planters, of which the following is a specification, reference being had to the accompanying drawings.

My invention relates to corn-planters; and consists of the arrangement of a swivel attached to a colter, and operated by means of an adjustable screw working in a nut formed in a bar that is pivoted to the side frames, for the purpose of varying the depth of the cut of the colter.

Figure 1:
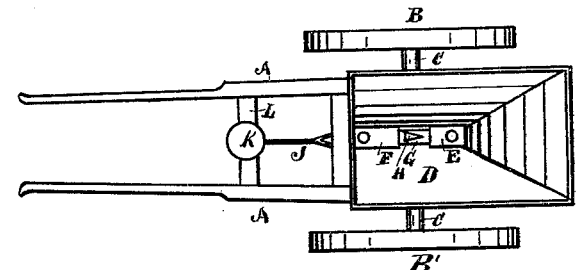
Figure 2:
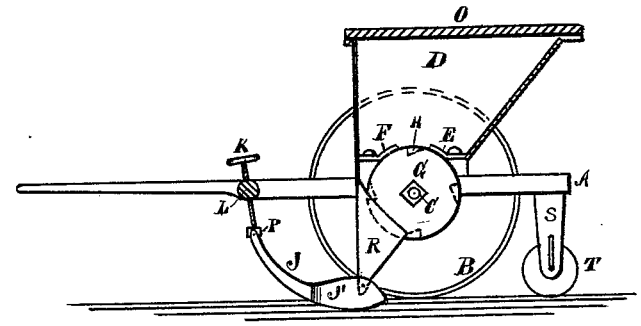

Figure 1 represents a plan view of my improved corn-planter. Fig. 2 is a side elevation of the same, partially in section, to show the arrangement of the working parts.

A A represents the frame of the machine, which extends far enough forward to form shafts for the horse. This frame is supported on the axle C and wheels B B, the axle revolving with the wheels in suitable boxing under the frame A. That portion of the shaft C to which the feed-wheel G is attached is square. The feed-wheel G has several recesses, H, in its face, to receive the grain from the hopper D and convey it to the spout R. Inside of of the hopper D, and arranged to scrape or rub on the face of the feed-wheel G as it revolves, are two scrapers, E F, so as to prevent the grain from dropping out at any other place than the one desired. The colter or sod-cutter J is formed sharp on its front edge, and is pivoted to the swivel P, to which is also pivoted the end of the adjusting-screw K, which works in a nut formed in the bar L, that is also pivoted to the side frames A A. The lower end of the colter J is spread apart, as at J', and is pivoted to the lower end of the spout R.

By raising or lowering the screw K, the colter J is made to cut more or less in the ground, and the spread part J' opens the furrow sidewise, so as to receive the corn that is fed from the hopper D, and as the machine is moved forward the roller T, which is attached to the bracket-hangers S, closes up the dirt over the grain.

What I claim as new, and wish to secure by Letters Patent, is—

In combination with frame A A' and colter J, the adjusting-screw K, swivel P, and pivoted bar L, substantially as and for the purpose described.

In testimony whereof I have signed my name to this specification in the presence of two subscribing witnesses.

MARK WHISLER.

Witnesses:
S. A. FRINK,
E. O. FRINK.